March 1, 1949.

P. M. FIELD 2,463,026

ADJUSTABLE PLATFORM FOR OPAQUE
COPY AND PICTURE PROJECTORS

Filed Nov. 7, 1946

INVENTOR.
PHILIP M. FIELD

BY

ATTORNEY

March 1, 1949.  P. M. FIELD  2,463,026
ADJUSTABLE PLATFORM FOR OPAQUE
COPY AND PICTURE PROJECTORS
Filed Nov. 7, 1946  2 Sheets-Sheet 2
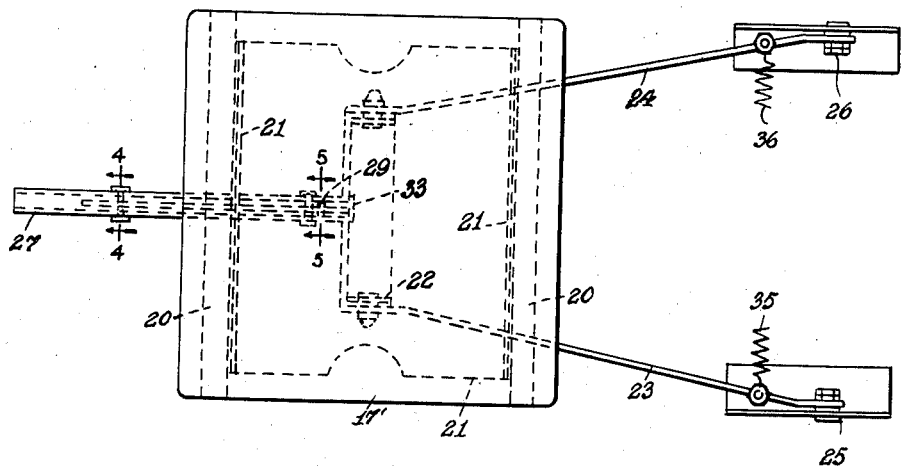
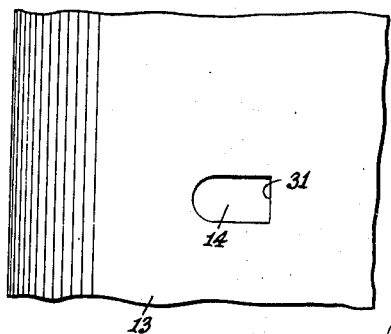
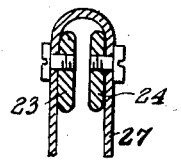
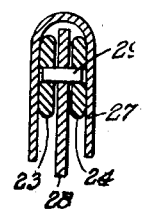
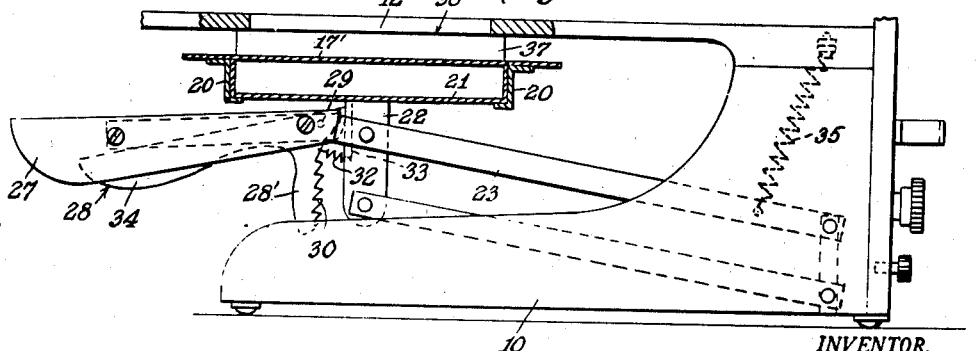
INVENTOR.
PHILIP M. FIELD
BY
*Fred'k T. Schuetz*
ATTORNEY Patented Mar. 1, 1949

2,463,026

UNITED STATES PATENT OFFICE 2,463,026

ADJUSTABLE PLATFORM FOR OPAQUE COPY AND PICTURE PROJECTORS

Philip M. Field, New York, N. Y., assignor to Charles Beseler Company, New York, N. Y., a partnership Application November 7, 1946, Serial No. 708,402

3 Claims. (Cl. 88—24)

1

The invention relates to projector apparatus designed more especially for the projection of opaque copy such as photographs, post cards, pages of a book or magazine, as well as three-dimensional objects.

The invention has for an object to facilitate opaque projection, more particularly in the provision of an adjustable platform for receiving the material to be projected.

The invention has for a further object to provide means for latching temporarily such platform to support the copy in any desired position below the normal plane of projection.

A still further object of the invention is to provide resilient means in connection with the support for the copy platform whereby to return the latter automatically to the proper projection plane upon release of the latching engagement.

In carrying out the invention, the opaque copy is inserted in the usual tray, or directly upon a platform designed to receive such tray, the platform being lowered sufficiently to accommodate the same conveniently. This is effected by means of a handle member and a movable platform support swingably connected to the frame of the projector in such a manner that the platform will remain in parallel planes irrespective of the angularity assumed by the swingable connections.

Said platform is temporarily locked in this depressed position for inserting the copy, as by means of a latching member pivoted to the said handle member and having a serrated edge or the like adapted for engagement with an edge of a perforation in a wall of the projector frame. Resilient means are provided to urge this serrated edge of the latching member in the direction of the perforation edge; and there is provided, also, resilient means for returning the platform automatically to its normal position, upon release of said latching engagement.

The nature of the invention, however, will best be understood when described in connection with the accompanying drawings, in which:

Fig. 2 is a fragmentary plan view showing the platform with its movable support means and actuating handle.

Fig. 3 is a fragmentary plan view of a portion of the frame wall.

Figs. 4 and 5 are transverse vertical sections, on an enlarged scale and taken, respectively, on the

Figure 1:
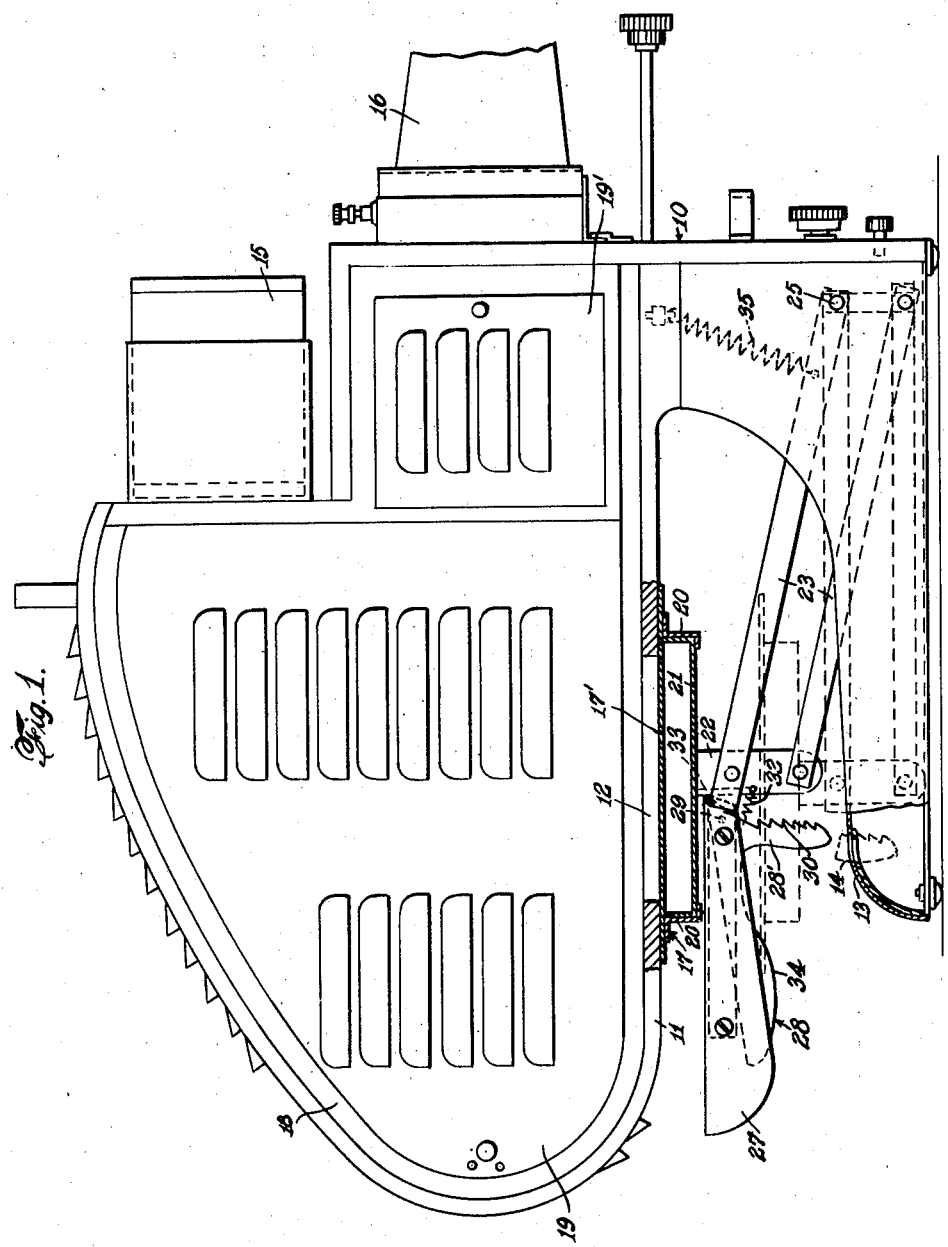
Fig. 1 illustrates, in side elevation, an opaque copy projector apparatus equipped with the novel platform adjustment means, portions of walls of the supporting frame being shown in vertical section.

2 lines 4—4 and 5—5, Fig. 2 of the drawings, and looking in the direction of the arrows.

Fig. 6 is a fragmentary elevation and part vertical section illustrating copy of substantial thickness positioned on a supporting platform and in position for projection, the platform being depressed to accommodate the copy.

Referring to the drawings, 10 designates the frame of the projector apparatus including the horizontal wall portion 11 with projection aperture 12 and transverse wall portion 13 having a perforation 14 therein for the purpose hereinafter set forth. The projector is shown as provided with an opaque copy projector lens 15 as well as a stereopticon projector lens 16, the particular projector apparatus shown being suitable for both opaque projection and lantern-slide projection. However, the invention is concerned solely with the projection of opaque matter and more especially with means for effecting a temporary adjustment of the platform or removable tray 17 for such matter. The remaining mechanism of the projector apparatus, being of usual construction, forms no particular part of the present invention. For access to the projection operating mechanism in the interior of the projector housing 18, suitable doors 19 and 19' are provided at the operating side of the projector.

The platform 17 may conveniently be constructed of structural members such as the pair of Z-sections 20 and top plate 17' which are welded or otherwise secured together to afford a removable tray element. The latter is mounted to this end over a channel section 21 carried by a movable support or U-shaped member 22. This support 22, in turn, is pivotally connected at its opposite arms to the respective ends of two pairs of parallel bars 23 and 24 having their opposite ends pivotally connected to the frame as indicated at 25 and 26, respectively.

The support 22 for the platform is fixedly secured to the channel section 21; and for convenience in construction, the upper members of the pairs of bars 23 and 24 are continued beyond the U-shaped support 22 being bent inwardly horizontally and at right angles thereto, and then again at right angles and juxtaposed to fit within an operating handle member 27 constructed, for example, in the form of a channel, and to the walls of which channel they are both securely attached to make said handle member an integral part of the movable support and whereby the same with platform 17 may be manually depressed and raised for adjustment of copy, for example, to the position shown in dotted lines, Fig. 1 of the drawings.

In effecting this adjustment, provision is made to retain temporarily the platform in its adjusted position. To this end, there is pivoted in the handle member 27 a bell-crank latch member 28, extending between the extensions of the upper of bar members 23 and 24, as by means of a pin 29 about which the latch member fulcrums. The one arm 28' of the latch member is juxtaposed to the perforation 14 of the transverse wall portion 13 and its one edge is provided with ratchet teeth or serrations 30 designed when the handle member is sufficiently depressed to engage the edge 31 of the perforation. A spring 32 attached to the latch member and to an extension 33 of the movable support member 22 serves to urge normally said latch member toward the edge 31; and when the latter is engaged by the serrations 30, will hold the copy platform securely in its adjusted position until released by manual pressure upon the portion 34 of the latch member projecting beyond the side walls of the handle member.

Furthermore, and to insure return of the platform and release of the latching mechanism, a pair of tension springs 35 and 36 may be connected to the upper of the pairs of bars 23 and 24, respectively, between their two said pivotal connections. By this expedient, copy 37, Fig. 6 of the drawings, located upon the platform 17, will be brought into contact with the bottom surface of the horizontal portion 11 of the frame so that the upper surface 38 of said copy, which is to be projected, will be brought to the proper optical plane of projection at the aperture 12. It will be understood, of course, that the platform or tray 17 is made removable laterally only for convenience and that the same might be omitted entirely and the channel 21 constructed to accommodate the copy.

I claim:

1. In an opaque copy projector: a frame including a perforated wall, a copy platform and a support therefor pivoted to move about an axis parallel to the plane of the copy platform, a copy-adjustment handle fixed to the movable support, a bell-crank latch pivoted thereto, one arm being juxtaposed to the perforation of the frame wall to enter said perforation and having a serrated edge adapted for engagement with its edge, and a spring urging the serrated edge toward said perforation edge.

2. The opaque copy projector according to claim 1, wherein the handle for displacing the platform is a continuation of the platform support, said handle having side walls and extending beyond the point of attachment of said support to the platform, and the bell-crank latch is pivotally connected with the handle between said side walls thereof, the tension spring connecting said latch with the copy platform.

3. The opaque copy projector according to claim 2, wherein the platform support comprises bars pivotally connected with the platform and having portions beyond the platform parallel to each other and fixed respectively to the side walls of the handle, and the bell-crank latch is pivoted to said bars.

PHILIP M. FIELD.

REFERENCES CITED

The following references are of record in the file of this patent:

UNITED STATES PATENTS

| Number | Name | Date |
|---|---|---|
| 1,111,090 | Patterson | Sept. 22, 1914 |
| 1,365,599 | Patterson | Jan. 11, 1921 |
| 1,424,847 | Ott et al. | Aug. 8, 1922 |
| 1,831,766 | Hanks | Nov. 10, 1931 |
| 1,848,378 | Ott | Mar. 8, 1932 |
| 2,328,616 | Cockburn | Sept. 7, 1943 |
| 2,332,691 | Blaisdell | Oct. 26, 1943 |